Patented Aug. 2, 1938

2,125,398

UNITED STATES PATENT OFFICE 2,125,398

PROCESS OF MILK STERILIZATION

Joseph S. Reichert and Robert W. McAllister, Niagara Falls, N. Y., assignors to E. I. du Pont de Nemours & Company, Wilmington, Del., a corporation of Delaware No Drawing. Application May 4, 1934, Serial No. 723,942

5 Claims. (Cl. 99—213)

This application relates to a process for sterilizing milk, or mixtures containing milk, and is a continuation in part of our copending application, S. N. 722,148, filed on April 24, 1934.

In our copending application we have described a process of rendering milk and milk mixtures, such as flavored milks and chocolate milks, completely sterile, thereby destroying all obnoxious bacterial life and enhancing the keeping qualities of the milk or milk mixture in a surprising manner. According to that application, hydrogen peroxide in amounts ranging generally from 0.01% to 0.04% is introduced into the milk or milk mixture and the product is then subjected to a heat treatment at temperatures below pasteurization for periods of time ranging generally from 15 to 30 minutes. The range of temperatures at which this treatment is to be carried out, as disclosed in our copending application, is generally within temperature limits, 55–61° C.

We have now discovered that if the milk is highly infected with micro-organisms or if it has been allowed to stand for a comparatively long period of time without provision being made for its sterilization, a sufficiently high degree of sterility may not be produced under some circumstances by the method forming the subject matter of our earlier application. Ordinarily, this is not a very frequent occurrence but we have discovered that if milk is allowed to stand in the open air at room temperature, especially when the weather is warm, for some hours before sterilization, it may be necessary in order to produce a satisfactory degree of sterility in the product to subject it to a temperature of 61° C. or temperatures in excess of 61° C. in conjunction with treatment with hydrogen peroxide in the necessary amount.

We have also discovered that when the heat treatment of our copending application is carried out at the relatively higher temperature range of 61 to 63° C., which is within the limits of those temperatures suitable for pasteurization, it is frequently possible to use a smaller quantity of hydrogen peroxide than the minimum value of about 0.01% stated to be ordinarily necessary in that application. At this time, it may be well to state that no absolute minimum percentage of hydrogen peroxide is to be construed as necessary in our general process, either that process forming the subject matter of our copending application or the method herein disclosed. We have merely advised that a lower value of 0.01% hydrogen peroxide be employed ordinarily in our copending application as the result of a multitude of experiments that have been performed with different milks. Neither do we desire that our invention be construed as necessitating the presence of minimum amounts of hydrogen peroxide in this case for we have found that when the higher temperature range, 61° C.–63° C., is employed in conjunction with the disclosed hydrogen peroxide treatment, amounts of peroxide very frequently considerably below 0.01% may produce substantial sterility.

It is also one of the objects of this invention to substitute for the hydrogen peroxide that is added in either this treatment method or in the process of our copending application, other active agents which will necessitate the use of still smaller quantities of hydrogen peroxide. As such an active agent we have found that potassium iodide and hydrogen peroxide, either as the compound $H_2O_2.KI$ or as a mixture of these compounds may be used and in these cases the hydrogen peroxide content can ordinarily be somewhat lower than if hydrogen peroxide alone is employed. This treatment may be coupled with heating within the temperature range of our copending application, 51–61° C. or within the temperature range of this application, 61–63° C.

In certain cases pasteurization alone is not effective to sterilize nor is treatment with hydrogen peroxide unaccompanied by an elevated temperature sufficient to destroy the bacterial organisms present. Pasteurization at best destroys only a portion of the bacterial organisms present in milk and milk mixtures, even when the milk has been carefully preserved at refrigerating temperatures prior to pasteurization. Obviously, therefore, pasteurization is entirely insufficient to produce even a degree of partial sterility when a milk or milk mixture has been allowed to stand at ordinary temperatures for a considerable time prior to treatment. By the utilization of hydrogen peroxide and heat treatment, in accordance with the process of this application, or by employing in lieu thereof, another active sterilizing agent as disclosed herein, it is possible to render milk which is even highly polluted with bacterial organisms substantially sterile, if not entirely free from living bacteria.

At this time it may be advisable to point out that there is evidence that in certain foreign countries hydrogen peroxide in very small amounts has been added to milk which was then heated to a temperature of 70–71° C. The objection to a high temperature of treatment as 70–71° C., is that the milk will assume the "cooked" flavor and odor normally associated with boiled or heated milk. This is of course an important defect in this method known to the prior art and one that is avoided in our process in which lower temperature limits are selected for the heat treatment which follows the hydrogen peroxide addition.

As another disadvantage attendant high temperature treatment, we may state that the cream line marking the apparent demarcation between the milk and cream in a bottle of milk is ordinarily affected when too high a temperature is maintained during the heat treatment. The milk apparently contains less cream after the relatively high temperature treatment than it did before being heated. Commercially this is an important disadvantage since the purchaser is accustomed to determine the comparative virtues of different bottles of milk by reference to the amount of cream which seems to be present in each.

Moreover, high temperature pasteurization also destroys to a much greater extent the vitamine A present in the milk than a treatment at a lower temperature. Heating to high temperatures also has a tendency to impair the quality of the milk by making digestion more difficult. This defect is due to an apparent coagulation of the fat globules present therein and to chemical and/or physical changes in the protein occasioned by the high temperature. All these factors make it desirable to maintain the treatment temperature as low as consistent with substantial sterilization.

When using our method we find that complete sterility can be obtained by heat treatment within the range, 61–63° C., even for milks which are badly polluted before being so treated, by the addition of hydrogen peroxide in amounts up to 0.03%. While we do not desire to specify a lower limit, it may be stated that ordinarily 0.0075% hydrogen peroxide is ample unless the milk or milk mixture contains an excessive number of micro-organisms.

After the addition of the hydrogen peroxide, the milk is heated to a temperature sufficiently high to effect pasteurization, which is ordinarily within the range 61–63° C. The time required may vary from 15 minutes to an hour although here again we do not desire to be limited to any specific time period of heat treatment. Ordinarily 15 minutes will be entirely sufficient to bring about substantially complete sterility and in general the time during which the milk or milk product is subjected to the high temperature should be as short as possible. The hydrogen peroxide may be introduced when the milk or milk mixture is cold, before the heat treatment, or the hydrogen peroxide may be stirred in during the time the liquid is at the selected temperature.

We have found that in operation the sterilizing action of hydrogen peroxide is substantially identical with its action when the temperature is maintained below the pasteurizing value as in our copending application. While theories explaining the antiseptizing action have not been completely established by experimental evidence, apparently the hydrogen peroxide is decomposed by the combined action of the heat and catalase and/or peroxidase present in the milk or milk mixture, which then acts to destroy the bacterial organisms present.

It is to be understood that our process is particularly adapted for the treatment of milk mixtures such as chocolate milk, vitamine D milk, and iodinized milk, as well as in the sterilization of whole milk itself. Particularly where the milk is intended for medical use in feeding infants and invalids it becomes absolutely essential that the milk be substantially entirely sterile. Since vitamine D containing milk and iodinized milk are ordinarily prescribed by physicians for people who may show serious health defects by the absence of either of these essential ingredients from their diets, our process is particularly adapted for the sterilization of milk employed to prepare such special milk products.

As a substitute for hydrogen peroxide in our process, we have found that potassium iodide and hydrogen peroxide either as the compound $H_2O_2.KI$ or as the two separate substances may be added. In general, the use of this sterilizing agent will make it unnecessary to introduce as large an amount of hydrogen peroxide as is normally necessary and still obtain the desired sterilizing effect when the peroxide and potassium iodide are employed in conjunction with heat treatment, either within the temperature range 55–61° C. or within the range 61–63° C. For example, 0.01% hydrogen peroxide and 0.001% potassium iodide may be added, or similar proportions of these substances, but using less than 0.01% hydrogen peroxide may yield results fully as satisfactory under certain circumstances. In general, it will be found that hydrogen peroxide and potassium iodide in the relative proportions of ten parts of hydrogen peroxide to one part of potassium iodide will be found most satisfactory in our sterilizing process. This procedure has the added advantage of introducing iodine into the milk in the form of potassium iodide. Iodinized milk has come into considerable use in recent years to supplement iodine deficiencies in the diet of grown persons as well as for feeding infants and invalids.

We have found that milk treated in accordance with our novel process, even when highly infected by the micro-organisms before the sterilizing treatment is practiced, possesses enhanced keeping properties and does not turn sour or become spoiled on standing. Milk which has been prepared by treatment with hydrogen peroxide in the specified amount and subjected to pasteurization for periods of from 10 to 30 minutes has been found to remain substantially unchanged when allowed to stand at room temperature for three to four months. This has been found to be the case even though previous to sterilization the milk possessed an extremely high bacterial count and a decidedly sour taste. The presence of any hydrogen peroxide in the milk after treatment could not be detected either by taste or odor, nor by any of the well known tests for hydrogen peroxide such as with the reagents paraphenylenediamine and benzidine. There was no discernible hydrogen peroxide flavor nor could the odor of this chemical be detected in any milk or milk product treated in accordance with the procedure described in this application. When the amount of hydrogen peroxide does not substantially exceed 0.03% we have found that after the milk has been allowed to stand for a short period of time the presence of free hydrogen peroxide therein cannot be detected by any test known to chemists. We have concluded therefore that there is present in the milk or milk mixture no free hydrogen peroxide after the treatment herein described.

The various details of the treatment which have been described in disclosing the preferred embodiment of our novel process are to be considered as merely illustrative and not as restrictive. Wherever we refer to "milk" in the claims, it is to be understood that this term includes mixtures containing milk such as chocolate milk, flavored milks, vitamine D milks, iodinized milks etc. or any mixture in which cows' milk comprises an important or predominating ingredient, and the term "milk" is to be so interpreted in construing the scope of the protection afforded by the claims.

We claim:

1. A process of sterilizing milk or milk mixtures which comprises adding to the milk hydrogen peroxide and potassium iodide in amounts which bear a ratio to each other of 10 parts of hydrogen peroxide to 1 part of potassium iodide.

2. A process of sterilizing milk or milk mixtures which comprises adding thereto as a sterilizing agent potassium iodide and hydrogen peroxide.

3. A process of sterilizing milk or milk mixtures which comprises adding thereto 0.01% hydrogen peroxide and 0.001% potassium iodide.

4. A process of sterilizing milk or milk mixtures which comprises adding thereto hydrogen peroxide and potassium iodide and then heating the mixture to a temperature of 55-61° C. for a period of time ranging from 15 minutes to 1 hour.

5. A process of sterilizing milk or milk mixtures which comprises adding thereto hydrogen peroxide and potassium iodide and then heating the mixture to a temperature of 61-63° C. for a period of time ranging from 15 minutes to 1 hour.

JOSEPH S. REICHERT.
ROBERT W. McALLISTER.